Feb. 25, 1936.  G. B. MARSDEN  2,031,841
RADIO TUNING SYSTEM
Original Filed March 3, 1930  4 Sheets-Sheet 1
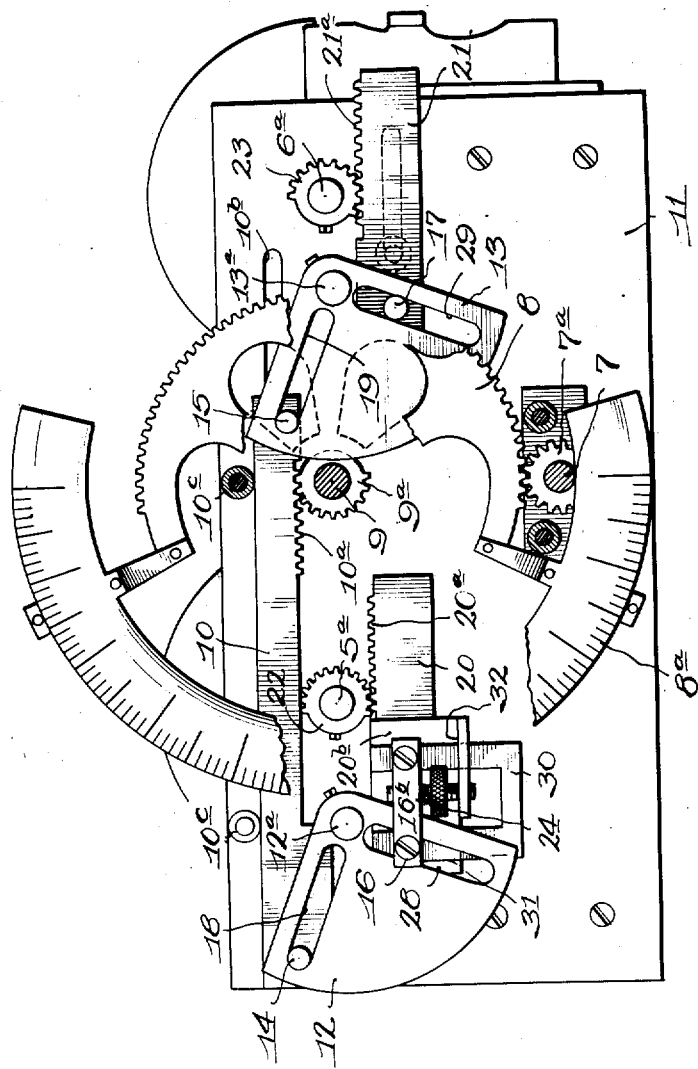
Inventor,
George B. Marsden, Feb. 25, 1936. G. B. MARSDEN 2,031,841
RADIO TUNING SYSTEM
Original Filed March 3, 1930 4 Sheets-Sheet 2
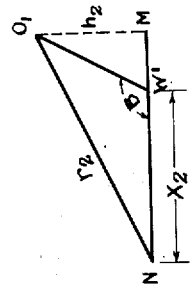
Fig. 3
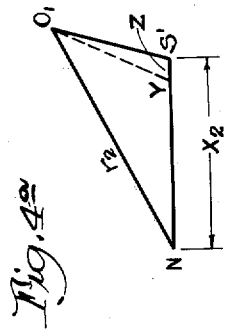
Fig. 4ᵃ
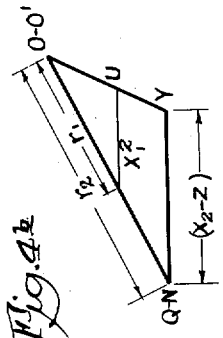
Fig. 4ᵇ
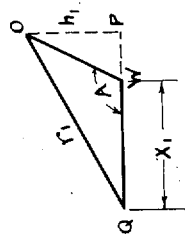
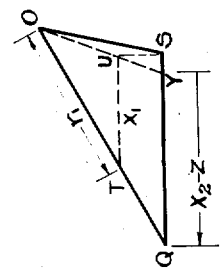
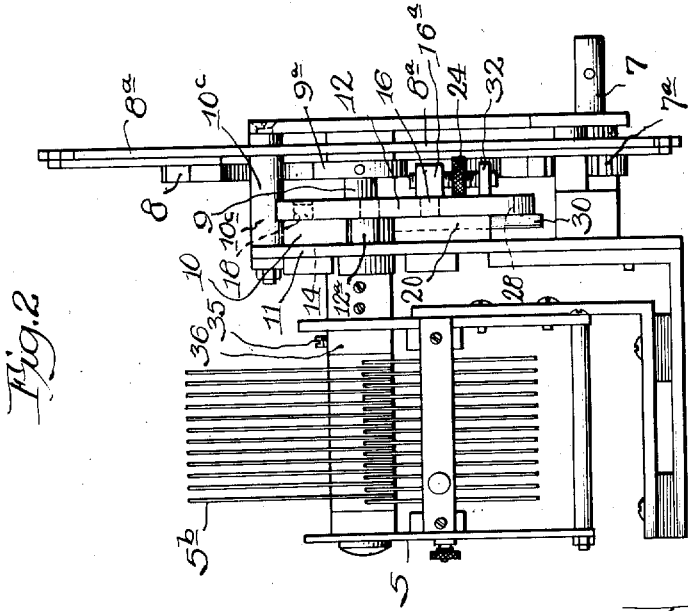
Fig. 2
Witness:
Chas. K. Kornish
Inventor,
George B. Marsden,
Offield Towle Hope Scott & Poole Attys.

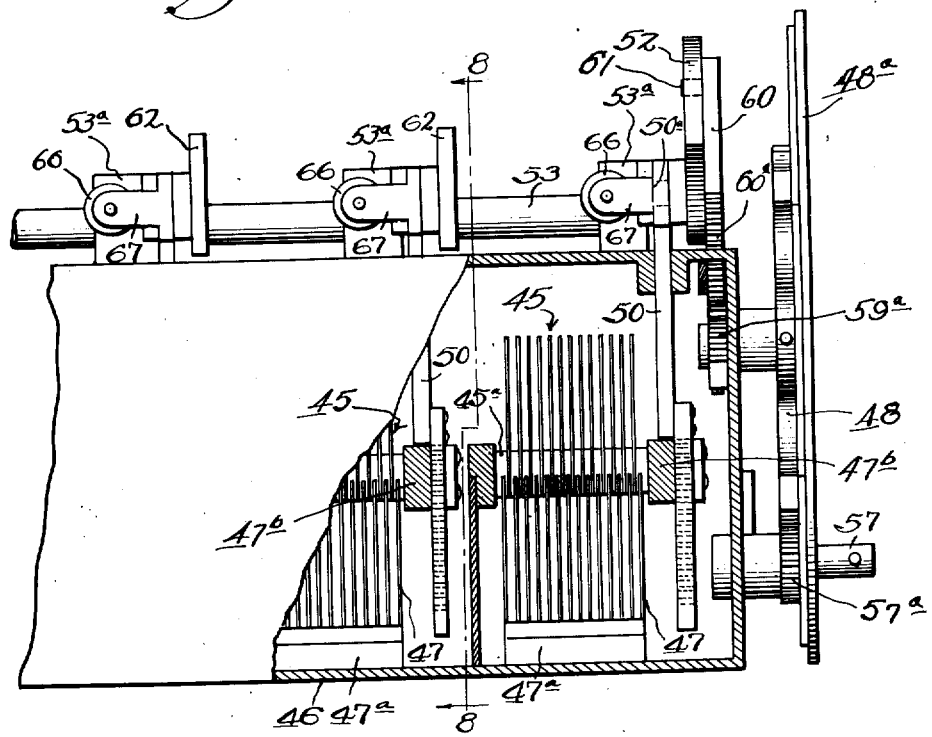

Patented Feb. 25, 1936

2,031,841

UNITED STATES PATENT OFFICE 2,031,841

RADIO TUNING SYSTEM

George B. Marsden, Los Angeles, Calif.

Application March 3, 1930, Serial No. 432,810
Renewed March 28, 1935

2 Claims. (Cl. 74—10)

This invention relates to improvements in radio tuning apparatus, and more particularly to multi-circuit radio apparatus having a single control therefor.

In a prior application, bearing Serial No. 322,345, filed November 28, 1928, of which this application is a continuation in part, I have disclosed an improved method of tuning, and apparatus for applying the same, whereby two or more circuits may be continuously held at resonance to mutual wavelengths by means of a single control without necessitating the matching of the inductance capacity values of the individual circuits.

As in the prior application referred to, the present invention is based upon the principle that there is a direct relationship between the angles of rotation of the sets of variable condenser plates of any two rotatable condensers of the same type from the positions where their respective circuits are tuned to a minimum wavelength ($\lambda$=215 meters or thereabouts) to the positions where their respective circuits are mutually tuned to a higher wavelength ($\lambda$=500 meters or thereabouts); and that the respective angles of rotation vary with the angle of rotation of the sets of plates having the lesser rotation at a rate equal to a constant (V), multiplied by some power of the mutually resonant wavelength, said power of the wavelength depending upon the design of the condensers employed.

I have demonstrated that this relationship is found to exist wherever the tuning condensers are of identical design, that is, are all either of straight line wavelength, straight line frequency, straight line capacity, or some compromise, and customary mechanical precision is used in their construction.

The apparatus disclosed in the prior application above referred to, provided a means for determining the required correction constant (V) for any two circuits by initially determining with temporary dials, or their equivalent, the difference in angles of rotation of the two sets of plates between a lower and higher wavelength to which the two circuits are successively tuned, and then by reference to the proper formula, the necessary correction constant could be provided by establishing a permanent geared operating connection for the two condensers having a constant ratio which satisfies the formula above referred to. The specific geared connections shown in my prior application, comprise either two segments of varying radii connected to the separate condensers and operated from a single rack, or pulleys of varying radii operated by a single belt, chain, or the like.

One of the objections to this form of apparatus from the standpoint of large quantity production, is that a pinion or pulley with a particular sized radius must be cut for each circuit in every receiving set, or else large stocks of assorted sizes must be kept on hand to be used as required.

In a second application, Serial No. 404,561, filed November 4, 1929, I disclose an improved method of tuning based upon the same general principle of producing geared connections for each circuit whereby the variation in the rate of movement of such condensers may be first determined by formula, as before, but the resultant ratio is established by simple rectilinear adjustments of certain parts of the connecting mechanism. The second apparatus referred to, includes a plurality of similar equilateral triangular structures each having two legs of identical length. The desired ratio of movement of any two condensers was provided by adjusting the lengths of each pair of legs so as to change the sizes of the respective triangular structures in accordance with the value of the constant (V) obtained, as before, by initially determining by temporary dials, or their equivalent, the difference in angles of rotation of the two sets of plates between a lower and higher wavelength to which the two circuits are mutually tuned.

However, both forms of apparatus disclosed in the two prior applications above referred to, require the predetermination of the value of the ratio of the angular displacements at resonance and a computation of the proper lengths of radii, or adjustable legs of a triangular structure by means of a very accurate measurement to determine these lengths, and then a proper manual adjustment of the parts connected to the common control while both circuits are tuned to mutual resonance, all of which requires time, and presents opportunities for error both in the mathematical computation and in the manual adjustments of the apparatus.

In carrying out the present invention, I provide an improved and simplified form of operating connection for the several condensers whereby the proper ratio is automatically given to the adjustable parts during the adjustment of each circuit to a mutual resonance with the other circuit, so that thereafter all circuits remain at mutual resonance with any simultaneous rotation through the unitary control member. Therefore, the time required to adjust any receiver, is only that time which would be required to tune said receiver to only one mutually resonant wavelength with an individual control in each circuit, and the possibility of error in such adjustment has been reduced to an absolute minimum.

As will also more fully appear, my improved form of operating connection is equally applicable to condensers of the rotary and rectilinearly variable types.

The invention may best be understood by reference to the accompanying drawings, in which Figure 1 is a skeletonized view of a radio receiving set showing the operating connections to two condensers of the rotor type.

Figure 2 is a side view of the apparatus shown in Figure 1.

Figures 3, 4a and 4b are a series of diagrams illustrating the principle of operation of the tuning adjustments forming the basis for the present invention.

Figure 5 is a detail of the thumbscrew adjusting device used in the apparatus shown in Figures 1 to 3, inclusive.

Figure 6 is a side view showing a modified form of my invention as applied to a plurality of condensers mounted end to end in a shielded compartment.

Figure 9 is an enlarged detail of the thumbscrew adjusting device used in the apparatus shown in Figures 6 to 8 inclusive.

Figure 10 is a section taken on line 10—10 of Figure 9.

Figure 7:
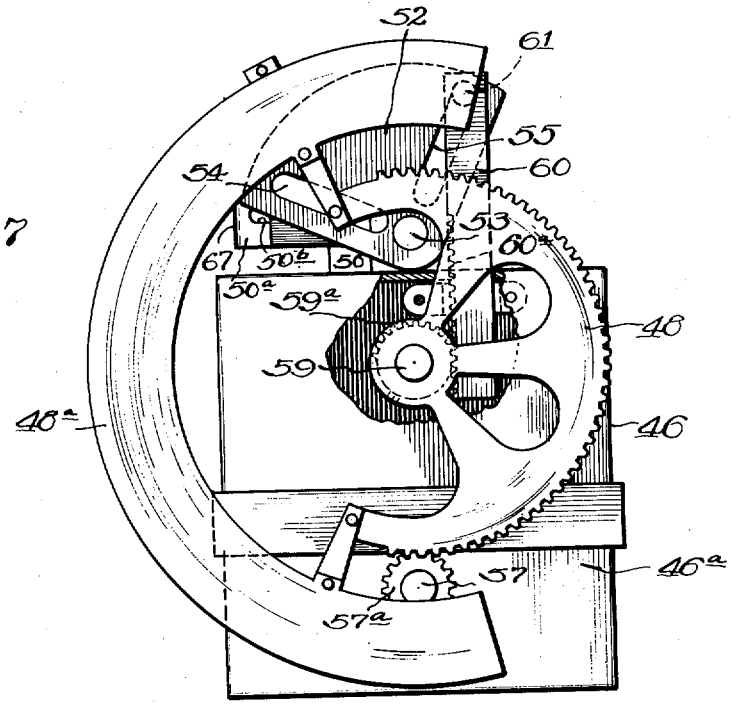
Figure 7 is a front end view of the apparatus shown in Figure 6.

Referring now to Figure 1, it will be seen that the embodiment of my invention therein disclosed is adapted for controlling the rotation of shafts 5a and 6a of two rotor type condensers of the usual form which are used for tuning separate stages of radio frequency amplification, as for instance, in a two stage radio frequency set, or in the antenna and oscillation circuits of the superheterodyne set. The condensers are mounted on a suitable support, herein consisting of a plate 11. The rotatable shafts 5a and 6a of the condensers are arranged in parallel relation and carry the usual rotor plates thereon, as shown at 5b and 6b, respectively.

A pair of identical operating segments 12 and 13 are pivotally mounted on studs 12a and 13a respectively carried on the front of the plate 11 adjacent the shafts 5a and 6a. The segment 12 is provided with a pair of grooves 18 and 28 extending radially from the axis of rotation of said segment, and at an angle of 90° to each other. A similar pair of grooves 19 and 29 is provided in the segment 13.

A rack 10 is mounted for lateral movement on the face of the plate 11 in a plane equidistant above the axes of rotation of the two segments, and suitable gearing connection is provided for moving said rack by means of the unitary manual control.

In the form shown, said manual control means includes an operating stud shaft 7 having a hand control knob of the usual form (not shown) thereon and provided with a pinion 7a meshed with a gear segment 8 which is relatively large and is adapted to have an indicator dial 8a suitably mounted thereon in the usual manner and provided with calibrations for tuning the set. The dial segment 8 is rotatably mounted on a stud 9 and has a pinion 9a carried thereby which meshes with teeth 10a carried on the under side of the rack 10.

The rack 10 is suitably guided for lateral movement, as for instance, in a longitudinal slot 10b supplemented by auxiliary rollers 10c—10c mounted on the face of the plate 11. A pin 14 is carried on the rack 10 and projects into the slot 18 of the segment 12, while a similar pin 15 projects into slot 19 on segment 13 so that a lateral motion of rack 10 caused by movement of the control shaft 7 causes a uniform rotation of the operating segments 12 and 13.

The arrangement shown in the drawings is such that the dial gear segment 8 is rotated through an angle of substantially 180°, while the pins 14 and 15 move the full length of their respective slots 18 and 19 to rotate the segments 12 and 13 at equal rates through substantially 60°.

Two racks 20 and 21 are mounted on the plate 11 to move in a line parallel with the movement of rack 10 and are provided with teeth 20a and 21a which respectively mesh with pinion segments 22 and 23 on condenser shafts 5a and 6a, respectively. A stud 17 is fixed on the right-hand rack 21 and projects into the slot 29 of segment 13. A pin 16 is mounted on rack 20 so as to be adjustable vertically thereof, and extends into the slot 28 of segment 12.

Any suitable means of adjustment of the latter pin 16 may be provided, in the form shown in detail in Figure 5, said pin projecting laterally from one prong of a U-shaped member 30 which moves up or down in the vertical grooves 31, 31 on a bracket 20b forming part of rack 20. A cross bar 16b is connected to the outer end of pin 16. The position of the pin 16 is adjustable by thumbscrew 24 connected between the cross bar 16a and a flange 32 on the lower edge of bracket 20b, the thumbscrew being thus arranged so as to shorten or lengthen the distance from pin 16 to the axis of the segment 12. The adjustment means just described is such that if the segment 12 is held from rotation, manipulation of the thumbscrew 24 in one direction or the other tends to shift the rack 20 to the right or left, and thereby change the positions of the two sets of condenser plates relative to each other.

In the initial position of the apparatus preparatory to tuning the same, the pins 16 and 17 are preferably arranged in the same horizontal plane at equal distance from the axis of rotation of the segments 12 and 13 so as to hold said segments in identical angular positions. The pins 14 and 15 are then at the extreme outer ends of the slots 18 and 19, respectively, and the condenser plates are at such position of minimum capacity that $\theta_1$ and $\theta_2$ are both zero, all as shown in Figure 1. In this position, the indicating dial 8a also indicates a reading at zero.

With the details of the operating mechanism illustrated in Figures 1 and 2 now in mind, it may be well to review the principle of operation of my tuning system as originally disclosed in my prior application, Serial No. 322,345. Following the mathematical development of this principle, it will then be manifest how the thumb screw 24 may be adjusted so as to vary the rates of rotation of the condensers 5 and 6 in such a manner as to maintain mutual resonance throughout the broadcasting range.

For convenience, two circuits employing straight line wave length condensers will be considered. The circuits may be numbered 2 and 1 whose respective components have the subscripts 2 and 1.

$Cd_2$ and $Cd_1$ are the condensers.

$C_2$ and $C_1$ are the condenser capacities.

$c_2$ and $c_1$ are the circuit distributed capacities—constants.

$L_2$ and $L_1$ are the actual coil inductances—also constants.

$La_2$ and $La_1$ are the effective inductances.

$\lambda_2$ and $\lambda_1$ are the respective wave lengths of resonance.

$\lambda$ is the wave length of mutual resonance where $\lambda_2 = \lambda_1$.

$a_2$, $a_1$, $k$, $q$, and $V$ are electrical constants.

$Q$ is a constant of integration.

$\theta_2$ and $\theta_1$ are the angular displacements of the condensers.

Basic formulae (For reference see U. S. Bureau of Standards Circular No. 74.)

(A) $\quad C_2 = a_2\theta_2^2$ and $C_1 = a_1\theta_1^2$ (B) $\quad \lambda_2 = k(La_2 C_2)^{\frac{1}{2}}$ and $\lambda_1 = k(La_1 C_1)^{\frac{1}{2}}$ (C) $\quad La_2 = L_2 + qc_2 L_2^2 \lambda_2^{-2}$ and $La_1 = L_1 + qc_1 L_1^2 \lambda_1^{-2}$

Mathematical development

Substituting (A) in (B) gives, (1) $\quad \lambda_2 = k(a_2 La_2)^{\frac{1}{2}}\theta_2$ and $\lambda_1 = k(a_1 La_1)^{\frac{1}{2}}\theta_1$ Therefore, at mutual resonance $\lambda$ where $\lambda_2 = \lambda_1$, it follows that, (2) $\quad \dfrac{\theta_1}{\theta_2} = \dfrac{(a_2)^{\frac{1}{2}}}{(a_1)^{\frac{1}{2}}} \cdot \dfrac{(La_2)^{\frac{1}{2}}}{(La_1)^{\frac{1}{2}}}$ And differentiating (2), gives (3) $\quad \dfrac{d\theta_1}{d\theta_2} = \dfrac{(a_2)^{\frac{1}{2}}}{(a_1)^{\frac{1}{2}}} \left(\dfrac{dLa_2}{dLa_1}\right)^{\frac{1}{2}}$ Interpreting Formula (3)—since $a_2$ and $a_1$ are constants, the rate of change in angular displacement of one set of rotary condenser plates varies with respect to the rate of change in angular displacement of the other set of condenser plates, as both circuits are constantly held at mutual resonance as the mutually resonant wave length is varied, and is equal to a constant times the square root of the rate of change in effective inductance in the one circuit with respect to the rate of change in the effective inductance in the other circuit.

Therefore, if the rate of change in effective inductance in the one circuit varies with respect to the rate of change in the effective inductance in the other circuit at a constant rate as both circuits are held at mutual resonance, it is evident that the rate of change in the angular displacement of one set of condenser plates with respect to the rate of change of the angular displacement of the other set of plates must also be a constant rate.

At mutual resonance where $\lambda_2 = \lambda_1$ differentiation of (C) gives, (4) $\quad \dfrac{dLa_2}{d\lambda} = -2qc_2 L_2^2 \lambda^{-3}$ and $\dfrac{dLa_1}{d\lambda} = -2qc_1 L_1^2 \lambda^{-3}$ And accordingly, (5) $\quad \dfrac{dLa_2}{dLa_1} = \dfrac{c_2 L_2^2}{c_1 L_1^2}$ Since all of the quantities in the right member of (5) are constants, the right member of (5) is a constant which shows that the rate of change in the effective inductance in one circuit varies with respect to the rate of change in the effective inductance in the other circuit, as both circuits are continually held at mutual resonance at a constant rate and therefore it follows that by (3) and (5), (6) $\quad \dfrac{d\theta_2}{d\theta_1} = V$ a constant value.

And integrating (6) gives (7)—

(7) $\quad \theta_2 = \theta_1 V + Q$ where $Q$ is the value of $\theta_2$ when $\theta_1 = 0$ Interpreting (7): When the set of condenser plates having the greater angular displacement at any point of mutual resonance is given the value $Q$ while the other set of condenser plates has an angular displacement of zero, both circuits will be tuned to the minimum wavelength of mutual resonance and if both sets of plates are then caused to rotate in such a manner that Formula (6) is satisfied, it follows that both circuits will mutually tune to resonance for all wavelengths up to the maximum wavelength obtainable or where the plates of the condenser having the greater angular displacement will have reached their position of maximum capacity.

Referring now more particularly to the operation of the adjusting mechanism forming the subject matter of the present invention, it will now be shown that a single adjustment can be made in the position of the pin 16 so as to give, automatically, the proper ratio or variation in the rate of movement of the two condenser shafts 5a and 6a, which ratio satisfies the formula for the constant (V) as above developed.

From Figure 1 it will be apparent that where segments 12 and 13 must always rotate at equal rates and the movements of racks 20 and 21 are in the same horizontal line where pins 16 and 17 are at the same distance from the centers of their respective segments at their initial equi-angular positions (and in lines that are parallel when they are at unequal distances from their centers), the line of motion of pin 16, its distance to the axis of segment 12 at its initial position and its distance to the axis at its position after any rotation of segment 12, describe the three sides of a scalene triangle.

Similarly, the line of motion of pin 17 and its initial and final distances from the axis of segment 13, describe a similar triangle. The two triangles thus described will be identical where the initial distance of pin 16 from the axis of segment 12 and of pin 17 from the axis of segment 13 are equal.

Referring now to the diagrams shown in Figure 3, O represents the axis of segment 12, P represents the point where a vertical line through O meets the extended line of motion of pin 16, and Q is the position of pin 16 after a given rotation of segment 12 so that OPQ forms a right triangle. Likewise, O'MN of Figure 3 forms a similar right triangle described by a similar movement of pin 17 and segment 13. Let $r_1$ equal the distance of pin 16 from O or OQ, and $r_2$ equal the distance of pin 17 from O' and let OP and O'M be equal to $h_1$ and $h_2$, respectively.

From the construction it is evident that the values of $h_1$ and $h_2$ will remain constant for all values of $r_1$ and $r_2$ given by different rotations of 12 and 13 simultaneously, and (8) $\quad r_1 = h_1 \sec R$ and $r_2 = h_2 \sec R$.

where R is the angle of rotation of 12 and 13.

Therefore, from (8), (9) $$\frac{r_1}{r_2} = \frac{h_1}{h_2}$$

And since $h_1$ and $h_2$ remain constant, the ratio of $r_1$ to $r_2$ and vice versa remains constant for any value of R.

In Figure 4a the triangles OSQ and O'S'N represent the movements of racks 20 and 21 from their initial positions when thumbscrew 24 has been adjusted so that 16 and 17 are at equal distances from their respective centers to a point where 20 has moved through a distance QS and 21 has moved an equal distance $x_2$.

Since pinions 22 and 23 have equal radii, the lateral movement of racks 20 and 21 or $x_1$ and $x_2$, respectively, will represent the arcs subtended by $\theta_1$ and $\theta_2$, and since by geometry the ratio of arcs subtended on equal circles is equal to the ratio of their central angles,

(10) $$\frac{\theta_2}{\theta_1} = \frac{x_2}{x_1}$$

Now considering Figure 4a: Suppose that when pin 17 has moved the distance $x_2$, it is found that circuit 2 is resonant to $\lambda_2$ but that circuit 1 is resonant to $\lambda_1$ which is greater in value than $\lambda_2$. It is apparent that to make both circuits mutually resonant to $\lambda_2$, QS will have to be reduced by some amount thus reducing the value of $\theta_1$ while the values of $x_2$ and $\theta_2$ remain fixed.

Consider the control shaft 7 held firmly so that segments 12 and 13 are unable to rotate as thumbscrew 24 is turned, so that pin 16 is raised to the point T in Figure 4a where it is found that both circuits are mutually resonant to $\lambda_2$. $r_1$ will then have been reduced in length from OQ to OT and $x_1$ will then have a value equal to that which rack 20 is moved through as the segments are turned back by control shaft 7 to the point where $\theta_1 = 0$, as shown by the dotted line TU which forms the base of the triangle OTU of Figure 4a.

It is evident from Figure 4a that as the control shaft is turned back, the pin 17 will not come back to its initial position but to a point Y. Where Y−S equals $z$ and the motion of rack 21 is $x_2 - z$, $\theta_2$ will then have a value greater than 0 when $\theta_1$ is equal to 0.

In Figure 4b the triangles OTU and O'NY of Figure 4a are shown in superposed relation. From this figure it is evident that,

(11) $$\frac{r_2}{r_1} = \frac{x_2 - z}{x_1} \text{ or } \frac{x_2}{x_1} = \frac{r_2}{r_1} + \frac{z}{x_1}$$

And from (8),

(12) $$\frac{\theta_2}{\theta_1} = V + \frac{Q}{\theta_1}$$

Hence from (11) and (12) it follows that,

(13) $$\frac{r_2}{r_1} + \frac{z}{x_1} = V + \frac{Q}{\theta_1}$$

But when $\theta_1$ is equal to zero by construction, $x_1$ is also zero and $z = x_2$ and $Q = \theta_2$ Hence as $\theta_1$ approaches the value zero and $x_1$ likewise approaches the value zero, Formula (13) approaches nearer and nearer the value

(14) $$\frac{r_2}{r_1} + \frac{x_2}{x_1} = V + \frac{\theta_2}{\theta_1}$$

until the difference between $$\frac{z}{x_1} \text{ and } \frac{\theta_2}{\theta_1}$$

will become less than any value, however small, and

(15) $$\frac{r_2}{r_1} = V$$

And since the ratio of $r_2$ to $r_1$ is a constant by (9) and V is a constant, it follows that (14) must hold true for any value of $\theta_1$ and corresponding value of $x_1$.

Therefore, by (13) and (14),

(16) $$\frac{z}{x_1} = \frac{Q}{\theta_1}$$

Multiplying the left member of (15) by $$\frac{x_1}{x_2}$$

and the right-hand member by $$\frac{\theta_1}{\theta_2},$$

gives

(17) $$\frac{z}{x_2} = \frac{Q}{\theta_2}$$

Which shows that when $x_2$ is equal to $z$, $\theta_2$ is equal to Q which by the interpretation of (7) shows that the two circuits will be mutually resonant to their minimum mutual wavelength when the control shaft 7 is turned back until $\theta$ is at zero. Since the ratio of the angular displacements must remain at a constant value equal to V by (14) the interpretation of (7) shows further that the circuits must remain resonant to a mutual wavelength with any angular rotation of 12 and 13, through any movement of the unitary control shaft 7.

Should it be necessary to increase the value of $x_1$ instead of decreasing it to attain mutual resonance, thumbscrew 24 would be turned in the opposite direction and the proof would have been substantially the same.

In securing resonance with a single adjustment screw to vary the radial length of the pinion it is preferable that the angles A and B in Figure 4a must have a value of 90° or more at the points of minimum capacity where $\theta_2$ or $\theta_1$ is equal to zero when $\lambda_2 = \lambda_1$.

In actual practice in tuning a superheterodyne, as was herein described for sake of brevity, where an adjustable device is placed on but one condenser circuit segment, 12, the control is preferably placed on the antenna circuit, as it is not in most instances as sharp in tuning as the oscillator circuit and will pass sufficient current to make it possible to readily detect the point where the oscillator circuit is resonant to a given frequency, although the antenna circuit may be resonant to a frequency thirty or forty kilocycles different.

Where the tuning method above described is applied to a tuned radio frequency receiver, suitable auxiliary adjustment controls corresponding to parts 16, 24, and 30 are provided for each circuit segment corresponding with part 12, and the receiver may then be tuned to any relatively low wavelength by the individual adjustment screws 24, without changing the position of unitary control knob 7. The set will then be synchronized so that movement of the control knob will tune all the circuits at all wavelengths within its normal range.

If it is desired that the indicator dial 8a read exactly zero at any particular frequency, as for instance, 1500 kilocycles, after the set has been synchronized as described and tuned to that particular frequency, the condenser shafts 5a and 6a may be temporarily fixed by any suitable means such as set screws 35 in collars 36 encircling the shafts and fixed on the frames of condensers 5 and 6. The pinions 22 and 23 on said shafts are then released by loosening their respective set screws 22a and 23a. The control shaft 7 can then be turned back until zero reading is obtained on the dial 8a, the pinion set screws retightened, and the condenser shaft clamping screws 35, 35 released.

It will be especially noted in connection with the construction and arrangement shown in Figure 1, that the rate of rotation of each of the condenser shafts is greater when the condensers are near their minimum capacities than at their maximum capacities. This is due to the interposition of a pivotal segment such as segment 12 between rack 10 and rack 20, which results in producing the effect of spreading out or separating the readings for the broadcasting channels at the lower range of wavelengths. This spreading of the lower broadcasting channels is particularly desirable where the condensers of the straight-line capacity type are used, which type of condensers, as is well known, ordinarily give the effect of crowding the lower wavelength broadcasting channels much more than the higher wavelength channels.

It will be manifest, however, that the initial angles of the operating segments may also be arranged to cause a greater rate of movement of the condensers near their maximum capacities, and thus cause spreading of the higher broadcast channels, or they may also be arranged at an intermediate position, so as to produce any desired compromise in spacing of the broadcasting channels about the indicating dial 8a.

Referring now to the modified form of my invention shown in Figures 6 to 10 inclusive, it will be seen that my device is applied to a plurality of rotor type condensers 45, 45 arranged in axial alignment with each other in a shielding compartment or casing 46. The stators 47 are mounted on insulation blocks 47a, and the shafts 45a of rotors 45b are each journalled on supports 45c of any suitable construction.

An operating segment 52 is fixed on a shaft 53 extending along the top of the casing 46, and suitably journalled thereon as by brackets 53a. The segment 52 is provided with two grooves 54 and 55 extending radially thereof, and at an angle of 90° to each other. This segment and its grooves correspond to the similar segments 12 and 13 shown in Figure 1.

Means for oscillating the segment 52 may be similar to the arrangement shown in Figure 1, and comprise an operating stud shaft 57 having a hand control knob of the usual form (not shown) thereon and provided with a pinion 57a meshed with a gear segment 58. Said gear segment is adapted to have an indicator dial 58a suitably mounted thereon and provided with calibrations for tuning the set. The dial segment is rotatably mounted on a stud 59 journalled in the front wall 46a and having a pinion 59a on the inner end thereof which meshes with teeth 60a of a rack 60, suitably guided for vertical movement along the inner face of the front wall 46a and extending through the upper wall of the casing (see Figures 6 and 7). A pin 61 projects from the upper end of rack 60, and moves in groove 55 formed in the segment 5a (see Figure 7).

The arrangement shown in the drawings is such that rotation of the dial gear segment 58 through an angle of approximately 180° will cause the pin 60 to move the full length of slot 55 and rotate the segment 52 and shaft 53 through substantially 60°.

It will now be observed that the shaft 53 has a plurality of lever arms 62 fixed thereon, each provided with a slot 84 which is disposed at the same angle with the axis of said shaft as the slot 54 formed in the segment 52, as previously described. Thus, by rotation of the shaft 52, the slots 54 and 64 are all rotated in unison with each other.

Figure 8:
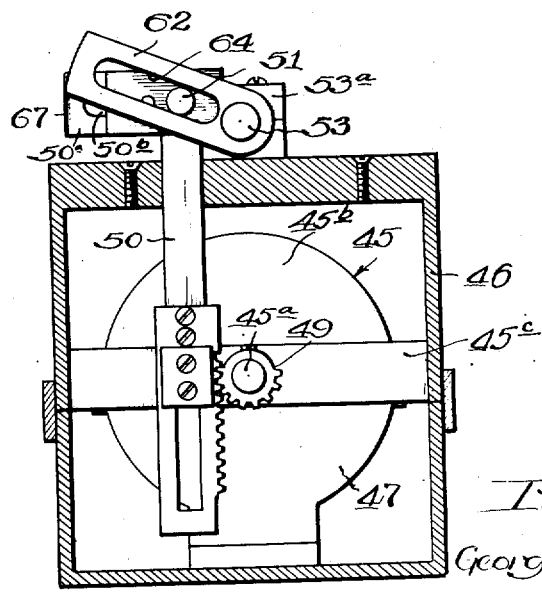
Figure 8 is a section taken on line 8—8 of Figure 6.

Means are provided for adjustably connecting each of the condenser shafts with one of the identically disposed slots 54 and 64, through the medium of a rack 50, having a pin 51 at its upper end movable in its respective slot. As seen in Figure 8, the rack 50 is guided for vertical movement on the cross support 48 and is meshed with pinion 49 of condenser shaft 45a. In this sectional view, the condenser shown is the second condenser from the end wall 46a, and therefore has connection with a lever arm 62 and slot 64. The rack 50 of the condenser immediately adjacent the end wall 46a, as seen in Figure 7, has a similar rack 50, but it is directly connected with slot 54 of segment 52.

The adjustment of the apparatus is provided by independently shifting the position of the pins 51 at an angle to the normal angle of the slots 54 or 64 within which said pins are movable, and thus giving the same variation in rates of movement of the several condenser rotors, as is accomplished by adjustment of the pin 16 in the form of device shown in Figures 1 to 3 inclusive.

The modified form of adjustment shown in detail in Figures 9 and 10, comprises a thumbscrew 66 extending between wings 67 and 68, connected respectively to the rack 50 and its pin 51, so as to adjust the position of the latter. In the form shown, the pin 51 is mounted on a plate 51a slidable on the inner side of bracket 50a integral with rack 50. A slot 50b is formed longitudinally of bracket 50a. Wing 68 is provided with a flanged portion 68a on the outer side of bracket 50a which is connected to the plate 51 by a block 69 slidable along the slot 50b, so that the wing 68 and pin 51 are movable as a unit relative to the rack 50 when adjusted by the thumbscrew 66. The adjustment thus provided, therefore, gives the same variation in angular positions of the several condenser rotors as is afforded in the form of apparatus shown in Figures 1 and 2, and the several circuits of the receiving set may be adjusted to mutual resonance in the same manner as already described throughout the broadcasting range of the set.

Although I have shown and described certain embodiments of my invention, it will be understood that I do not wish to be limited to the exact constructions shown and described, but that various changes and modifications may be made without departing from the spirit and scope of my invention as defined in the appended claims:

I claim:

1. In a unitary control tuning system, a control member, a plurality of circuits each tuned by a variable condenser, relatively adjustable intermediate driving connections for each of said condensers comprising similar pivotally movable members rotatable by said control member at uniform rates, and a rectilinearly movable condenser operating member connectible with each of said pivotally movable members, and means adjusting at least one of said rectilinear movable members at points along a radial line of its respective pivotal member to vary the effective radii of said pivotally movable members at ratios determined by mutually tuning their respective circuits to the same wavelength.

2. In a unitary control tuning system, a control member, a plurality of circuits each tuned by a variable condenser, relatively adjustable intermediate driving connections for each of said condensers comprising similar pivotally movable members rotatable by said control member at uniform rates, and a rectilinearly movable condenser operating member adjustably connectible with said pivotally movable members at points along a radial line of the latter to vary the effective radii of said pivotally movable members.

GEORGE B. MARSDEN.